Patented July 22, 1930

1,770,999

UNITED STATES PATENT OFFICE

WILLIAM K. SCHWEITZER, OF CLEVELAND, OHIO, ASSIGNOR, BY MESNE ASSIGNMENTS, TO THE GRASSELLI CHEMICAL COMPANY, OF CLEVELAND, OHIO, A CORPORATION OF DELAWARE

MANGANESE-ARSENATE INSECTICIDE OF LOW WATER SOLUBILITY

No Drawing.      Application filed December 17, 1927.   Serial No. 240,927.

Practical tests in the use of manganese arsenicals as insecticides have shown that the water solubility of the arsenic compounds contained in same is of prime importance for the availability of such compounds for this purpose.

The water solubility of such arsenicals is usually expressed as per cent. water soluble arsenic acid, $As_2O_5$, and is determined according to the method given in the "Official and Tentative Methods of Analysis of the Association of Agricultural Chemists", paragraphs 12 and 13, page 50, and paragraph 29, page 54, of the 1915 edition. This method consists substantially in the following: A 2-gram sample of the arsenical is digested in 1 liter of freshly boiled distilled water for 24 hours with hourly shaking for 8 of the 24. The test is then filtered and the $As_2O_5$ determined in the filtrate; the amount so found is referred to as the water soluble arsenic acid.

If the water soluble arsenic acid content of a manganese arsenical containing above 40% $As_2O_5$ in combined form is about 1% $As_2O_5$ or more, there is danger of serious burning when it is applied to tender foliage.

I have now found that if, in such a manganese arsenical of sufficiently high arsenic acid content, the water soluble arsenic acid content is reduced substantially below 1% $As_2O_5$, no such burning occurs, and I have found a novel manganese arsenate product of high total arsenic acid and low water soluble $As_2O_5$ content, having powerful insecticidal properties and a process of making the same.

In U. S. Patent 1,648,577 issued November 8, 1927, H. P. Corson describes a brown colored insecticide which is obtained by acting in presence of a catalyst such as nitric acid with manganese dioxid upon arsenious acid and treating the reaction product with an alkaline agent, such as lime. The manganese arsenate insecticide obtained in this manner is described as containing a total of 42.5% $As_2O_5$ and 2.36% water soluble arsenic as $As_2O_5$.

I have shown in my U. S. Patent 1,648,595, dated November 8, 1927, that a similar brown colored insecticide can be produced by reacting with manganese dioxid upon arsenious acid in presence of an alkaline agent such as lime. The product probably contains a mixture of various arsenic acid compounds. Made from technical crude materials, it contains between 40 and 50% arsenic acid and 2.5% water soluble arsenic, both expressed as $As_2O_5$.

My present invention comprises a modification and improvement of said processes as well as the novel insecticide obtained thereby, said insecticide containing arsenates of manganese as the main active ingredients, but having a water soluble arsenic acid content substantially below 1% and being exceedingly valuable for treating plant growths.

This novel process consists in effecting the reaction between the manganese dioxid and the arsenious acid under well defined and controlled conditions comprising effective stirring, superatmospheric pressure and temperatures above 100° C. For this purpose an apparatus must be used which will provide good agitation, thorough mixing, and which can be run under a steam pressure of at least 80 lbs. per square inch. It is desirable to provide an apparatus lined with some inert material, as I have found that certain metals, notably iron and steel, considerably slow down the oxidation. Lead is practically inert and can be used in the construction of equipment suitable for this reaction.

Any standard stirring device, if sufficiently efficient, set up in an autoclave lined with inert material, can be used to advantage in carrying out the reaction. Another convenient apparatus is constituted by a ball mill arranged for heating and withstanding pressures of at least 80 lbs. per square inch. The charge of arsenious acid and manganese dioxid or pyrolusite and eventually the alkaline agent and water, is introduced into the autoclave or ball mill and heat and agitation are applied for the requisite time. In both the pressure ball mill and the autoclave entirely similar and comparable results are obtained.

The presence of a catalyst for the reaction between the manganese dioxid and the arsenious acid is not essential when working under superatmospheric pressure and at temperatures above 100° C.; the reaction proceeds under these conditions without a catalyst at a speed which makes the reaction commercially possible, though catalysts such as nitric acid, nitrobenzene, etc., will further speed up the reaction.

My novel pressure method applies equally well to the two processes described in the above cited U. S. Patents, Nos. 1,648,577 and 1,648,595. That is to say, I can react with the alkaline agent upon the manganese arsenate as it is formed by the pressure reaction between the manganese dioxid and the arsenious acid or I can produce the manganese arsenate first under pressure and react subsequently thereon with the alkaline agent. The amount of alkaline agent used can vary within wide limits without substantially affecting the result. When using hydrated lime an amount of 10 or more percent. by weight of the combined manganese dioxid and arsenious acid weight is preferred.

In the two-stage process, that is to say, producing the manganese arsenate first and then treating same with the alkaline agent, it is desirable to limit the time of the action of the alkaline agent because prolonged treatment, due probably to some side reactions, increases again the water soluble $As_2O_5$ content.

The use of an alkaline agent in this reaction produces several desirable results. It contributes to the production of an insecticide of low water solubility; it produces a coloration of the finished arsenate ranging from grey to brown, the darkest shades of which make it very suitable for certain applications, and it affects the density of the insecticide producing a light fluffy material of high volume. While the reasons for the results obtained by this lime treatment are not fully understood, it is assumed that the alkaline agent reacts with part of the manganese arsenate to form hydrated manganese oxid, which is evenly and intimately distributed throughout the whole reaction product, and an arsenate of the alkaline agent. It is, therefore, preferred to use an alkaline agent, the arsenates of which are difficultly soluble in water.

The most easily available alkaline agent which I can use is lime, but others, such as the hydroxides of magnesium and barium, have been found to be convenient.

The pressure reaction between the manganese oxid and the arsenious acid is quite rapid. The presence of lime in the one-stage process slows down the speed of reaction without, however, making it commercially prohibitive.

For commercial application of my invention, it is, of course, desirable to make use of a cheap raw material, and I have found that natural manganese dioxid ore, or pyrolusite, is very well suited. In this case the fineness of the ore influences the speed of reaction, and it is usually advisable to employ a material the majority of which passes a 100 mesh screen or finer.

The manganese arsenate insecticides obtained by my novel process are grey to brown, light powders. When produced from pyrolusite they contain from 40 to 50% total $As_2O_5$ and less than 1% water soluble $As_2O_5$. They are chemically most probably mixtures of manganese arsenates intimately associated with arsenates of the alkaline agent used and more or less hydrated manganese oxid. They have been found to be powerful insecticides and can be applied to tender foliage without any harmful effect.

The following are a few examples of the application of my invention to the production of these novel insecticides, but the conditions given therein can be varied within wide limits without departing from the spirit of my invention.

The apparatus used was a lead-lined autoclave containing Danish pebbles and mounted to rotate in a horizontal position. The autoclave was heated directly with gas and through a hollow shaft and flexible coupling connection was made with a pressure gauge. The reaction was carried out at a pressure of 70 to 80 lbs. per square inch. The oxidation of the arsenious acid was checked and the runs carried to obtain complete oxidation. The autoclave was emptied directly on a steam-heated hot plate and the product completely dried. Different types of pyrolusite ore were used. A Java ore contained 16.7% available oxygen and 84.6% passed through a 300 mesh screen. The Caucasian ore contained 16.2% available oxygen and passed entirely through a 200 mesh screen. Cuban ore contained 15.13% available oxygen and 72.7% passed through a 300 mesh screen.

The following table shows the condition of reaction and the results obtained; the amounts are given by weight.

| White arsenic (amount) | Pyrolusite | | Hydrated lime (amount) | Water (amount) | Time of addition of lime | Time of oxidation (hrs.) | Time of 2nd stage reaction (hrs.) | Color of product | Water soluble $As_2O_5$ |
|---|---|---|---|---|---|---|---|---|---|
| | Grade | Amount | | | | | | | |
| 800 | Java | 800 | 240 | 4000 | After oxidation | 4 | 2 | Cream | .73 |
| 400 | Caucasian | 400 | 120 | 4000 | After oxidation | 4 | 2 | Cream | .60 |
| 800 | Java | 800 | 80 | 4000 | At beginning | 19 | ---- | Grey | .44 |
| 800 | Java | 800 | 160 | 4000 | At beginning | 49 | ---- | Cream | .95 |

In another series of operations on the two-stage process, a brick-lined autoclave was used, equipped with the necessary attachments for steam inlet, charging, sampling, measuring pressure, temperatures, etc.

The autoclave was charged with pyrolusite, white arsenic, water and Danish pebbles, and steam was applied to obtain 80 lbs. pressure. Samples were taken and tested at regular intervals until complete oxidation was obtained. The requisite amount of hydrated lime was then added and the charge run for another hour at 80 lbs. pressure. The resulting slurry was directly drum dried without washing. The product was then disintegrated by passing through a Raymond automatic pulverizer.

The following table gives the conditions of these operations and the results:

| White arsenic (lbs.) | Pyrolusite | | Water (lbs.) | Hours at 80-lbs. to complete oxidation | Lime (lbs.) | Total $As_2O_5$ (per cent) | Water soluble $As_2O_5$ (per cent) |
|---|---|---|---|---|---|---|---|
| | Grade | Lbs. | | | | | |
| 161 | Java | 167 | 625 | 4 | 81 | 40.8 | .65 |
| 100 | Cuban | 110 | 510 | 3 | 50 | 41.1 | .33 |
| 200 | Cuban | 220 | 750 | 2 | 100 | 42.1 | .23 |
| 200 | Java | 204 | 750 | 2 | 120 | ------ | .60 |

The color in all instances was of a light brown, and the product was found to have very desirable insecticidal properties.

In the two-step process, as exemplified above, I effect the treatment with the alkaline agent under superatmospheric pressure and at temperatures above 100° C. I also found that quite comparable results are obtained when the reaction product of manganese dioxid and arsenious acid as obtained in the first step pressure reaction is subsequently treated with the alkaline agent at atmospheric pressure and at substantially the boiling temperature of water.

I claim:

1. The process of making a manganese arsenate insecticide which comprises reacting with a manganese dioxid material upon arsenious acid under steam pressure of about 80 lbs. per square inch, and subsequently reacting with an alkaline agent, the arsenates of which are difficultly soluble in water, upon the manganese arsenates formed.

2. The process of making a manganese arsenate insecticide which comprises effecting the reaction of a manganese dioxid material with arsenious acid and an alkaline agent under superatmospheric pressure, at a temperature above 100° C. and under conditions of thorough agitation and mixing.

3. The process of making a manganese arsenate insecticide which comprises reacting with pyrolusite upon arsenious acid in a water slurry at a steam pressure of about 80 lbs. per square inch until the arsenious acid is substantially completely oxidized and subsequently treating the reaction product with hydrated lime to the amount of 5 to 30% of the combined weight of the arsenious acid and pyrolusite.

4. As a new product a manganese arsenate insecticide which has a water soluble $As_2O_5$ content below 1%, and which comprises manganese arsenates intimately admixed with the reaction product obtained by treating manganese arsenate, in aqueous slurry, with an alkaline agent, the arsenates of which are difficultly soluble in water.

5. As a new product a manganese arsenate insecticide which has a water soluble $As_2O_5$ content below 1%, and which comprises manganese arsenates intimately admixed with the reaction product obtained by treating manganese arsenate in aqueous slurry with hydrated lime.

6. As a new product a manganese arsenate insecticide characterized by having a water soluble $As_2O_5$ content below 1% and which comprises manganese arsenates intimately associated with a difficultly water soluble earth alkali metal arsenate and more or less hydrated manganese oxid.

7. As a new product a manganese arsenate insecticide characterized by having a water soluble $As_2O_5$ content below 1%, and which comprises manganese arsenates intimately associated with calcium arsenate and more or less hydrated manganese oxid.

In testimony whereof, I affix my signature.

WILLIAM K. SCHWEITZER.